(12) United States Patent
Harpaz et al.

(10) Patent No.: US 12,417,383 B2
(45) Date of Patent: Sep. 16, 2025

(54) NEURAL SIGNAL DETECTION

(71) Applicant: ORACLE INTERNATIONAL CORPORATION, Redwood Shores, CA (US)

(72) Inventors: Rave Harpaz, Redwood City, CA (US); William DuMouchel, Miami, FL (US); Stephen T. Bright, Las Vegas, NV (US)

(73) Assignee: Oracle International Corporation, Redwood Shores, CA (US)

( * ) Notice: Subject to any disclaimer, the term of this patent is extended or adjusted under 35 U.S.C. 154(b) by 1193 days.

(21) Appl. No.: 17/227,801

(22) Filed: Apr. 12, 2021

(65) Prior Publication Data

US 2022/0327377 A1    Oct. 13, 2022

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ............ G06N 3/04; G06N 3/045; G06N 3/08
See application file for complete search history.

(56) References Cited

U.S. PATENT DOCUMENTS

| 8,515,921 B2 | 8/2013 | Triebel et al. |
| 9,607,266 B2 | 3/2017 | Joseph et al. |
| 12,014,495 B2 * | 6/2024 | Oktay ............... G06F 40/166 |
| 2012/0143776 A1 | 6/2012 | Jaffe et al. |
| 2014/0067407 A1 | 3/2014 | Sathe et al. |
| 2014/0330615 A1 | 11/2014 | Dumouchel et al. |

OTHER PUBLICATIONS

Patent Cooperation Treaty (PCT), "International Search Report and Written Opinion", issued in PCT International Application No. PCT/US2021/0146933, having a date of mailing of May 27, 2022 (14 pgs).

(Continued)

*Primary Examiner* — Etienne P Leroux
(74) *Attorney, Agent, or Firm* — Kraguljac Law Group LLC

(57) ABSTRACT

Systems, methods, and other embodiments associated with neural signal detection are described. In one embodiment, for a plurality of reports: create a vector embedding for each of a set of information objects included in a report by an embedding layer of a neural signal detection network. The set of information objects includes a target object. Represent the report by a representation layer in a manner that describes correlation between occurrence of a target event and the information objects and accounts for dependencies between the information objects that make up the report. Model a set of events including the target event based on the representation of the report by a logit layer. Determine an occurrence probability for the target event, given the modeled set of events. Identify the presence of a signal by comparing a summary occurrence probability for the target event across the plurality of reports against a comparator probability.

20 Claims, 4 Drawing Sheets

(56) References Cited

OTHER PUBLICATIONS

Burkhardt, et al., "Predicting Adverse Drug-Drug Interactions with Neural Embedding of Semantic Predications", bioRxiv, dated Sep. 30, 2019, retrieved from the Internet at https//biorxiv.org/content/10.1101/752022v3.full.pdf [retrieved on May 4, 2022] (10 pgs.).

Cohen, et al., "Embedding of Semantic Predications", Journal of Biomedical Informatics, Academics Press, New York, NY vol. 68 Mar. 8, 2017 (17 pgs).

Oracle; About the Empirica (TM) Signal Application; pp. 1-3; Copyright 2002, 2019; downloaded on Apr. 9, 2021 from: https://docs.oracle.com/health-sciences/empirica-signal-90/ESIUG/Home_page_1.htm.

Dumouchel et al; Regression-Adjusted GPS Algorithm (RGPS), (Oracle—Health Sciences—An Oracle White Paper Nov. 2012; pp. 1-23.

Oracle; Smarter Signal Management: AI, big data, and predictive analytics (eBook), pp. 1-13; Oracle.com/healthsciences.

\* cited by examiner

NEURAL SIGNAL DETECTION

TECHNICAL FIELD

The systems and methods described herein relate to artificial intelligence computers and digital data processing systems, methods and products for the emulation of intelligence, including machine learning systems and artificial neural networks. More particularly, the systems and methods described herein relate to machine learning using a deep neural network with the capability to add to its integrated collection of facts and relationships for data signal detection.

BACKGROUND

Signal detection is the ability to differentiate between information bearing patterns—or "signal"—from random patterns that distract from or disguise the information—or "noise".

An adverse reaction is a patient response to a drug or other medical treatment that is noxious and unintended. The etiology of adverse reactions to drugs, biologics, vaccines, devices, or other medical products is complex and requires advanced analytical approaches for studying causal relationships between observed interventions and adverse events. Computational, also known as quantitative signal detection is a tool for screening potentially causal relationships between observed/reported products and adverse events.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
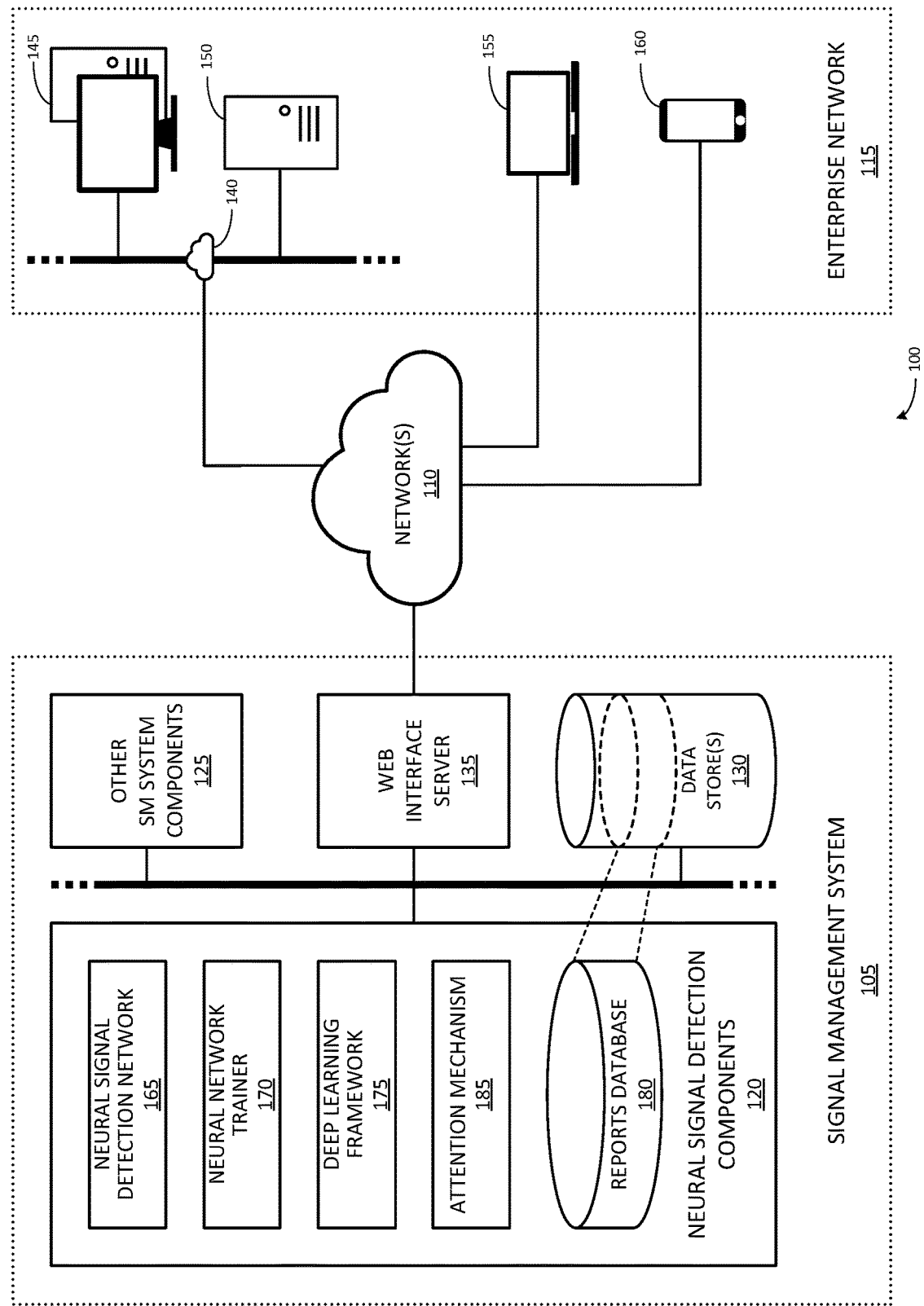
FIG. 1 illustrates one embodiment of a computing system associated with neural signal detection.

Systems and methods are described herein that provide neural signal detection (NSD), or signal detection using a neural network. The neural signal detection systems and methods described herein enable the modeling of complex dependencies between adverse events, medicinal products and other input factors, as well as address confounding and masking effects, thereby improving the accuracy of signal detection systems and methods. The neural signal detection systems and methods described herein reduces false alerts and missed signals over signal detection implemented using other statistical or machine learning methodologies. These improvements to accuracy result in more rapid or more timely signal detection. The neural signal detection systems and methods described herein enable simultaneous modeling of multiple events. The neural signal detection systems and methods described herein also enable the modeling of dependencies in the context of event or product hierarchies. The neural signal detection systems and methods described herein readily support the inclusion of external information (such as biochemical properties of drugs) in the inputs.

The neural signal detection systems and methods described herein are readily applied in safety and regulatory compliance contexts, such as patient safety. In one embodiment, neural signal detection systems and methods described herein are applied to detect adverse health effects of drugs, thus improving patient safety. For example, a target object for signal detection is a target drug, and a set of target events includes an adverse health event. In a converse case, the neural signal detection systems and methods described herein may be employed to detect serendipitous positive effects of drugs, thereby speeding medical research and improving patient health. For example, a target object for signal detection is a target drug, and a set of target events includes a positive health event. Further, neural signal detection systems and methods described herein may be applied to isolate the cause of failure of expected pharmacologic action, enabling identification of alternative courses of treatment and improving patient health. While neural signal detection may be discussed herein in the context of the advantages it provides in the health sector, neural signal detection may be advantageously applied in any field where there exist complex dependencies between inputs and output events, or where multiple events need to be modeled simultaneously in the context of hierarchies in output events or inputs.

The objective of signal detection algorithms is to produce statistical signal scores, also known as disproportionality ratios, which are used to highlight potentially new (or at least, previously undetected) events associated with particular inputs. Signal detection algorithms are built on techniques that model relationships between inputs and events. Neural signal detection (NSD) as shown and described herein uses deep learning (DL) techniques to model these relationships. The efficacy of signal detection algorithms is primarily judged on the accuracy of the signals they produce. Signaling errors lead to false alerts and undetected true events. The new neural signal detection algorithm shown and described herein could generates signals with greater accuracy than existing algorithms.

In one embodiment, when applied to a pharmacovigilance dataset, the statistical significance scores (disproportionality ratios) are used to detect adverse events associated with the use of pharmacological products. The improved sensitivity and accuracy in signal detection offered by the neural signal detection systems and methods described herein reduces false alerts, which are costly to pharmaceutical companies. Also, the improved accuracy in signal detection offered by the neural signal detection systems and methods described herein reduces undetected true events, preventing harm to patients. Further, the improved sensitivity in signal detection offered by the neural signal detection systems and methods described herein enables true events to be detected earlier, or from smaller datasets, again preventing harm to patients.

No action or function described or claimed herein is performed by the human mind. No action or function described or claimed herein can be performed by the human mind. An interpretation that any action or function can be performed in the human mind is inconsistent with and contrary to this disclosure.

Signal management software systems such as Oracle® Empirica Signal are software applications that users such as pharmaceutical companies use to manage, track, and identify new adverse (or positive serendipitous) events associated with their products (such as pre- and post-market drugs, biologics, vaccines, devices, and combination products). Signal management software may implement several signal detection algorithms to accomplish the identification of signal in available data. In one embodiment, the data on which signal detection systems and methods operate are spontaneous reports (such as individual case safety reports) of adverse events collected and managed by its customers. Each report is available in structured format and contains the reported adverse events, the suspected pharmaceutical products associated with the events, dates, limited patient demographic information (e.g., age and gender), reporter information, and potentially other information related to the reported adverse events. In one embodiment, the data on which signal detection operates are dynamically generated event reports following the same structured format, but generated from patient data that records the information, but is not submitted as a reported adverse event. For example, this patient data may be drawn from the patient records of a hospital or group of hospitals. This data may be anonymized. In another example, the data on which signal detection operates may include medical literature, or other data sources that include information from which a report may be compiled.

Signal management software may make available one or more signal detection methodologies that range in complexity and ease of use. Canonical methodologies, such as proportional reporting ratio (PRR), multi-item gamma Poisson shrinker (MGPS), and information component (IC), are based on 2×2 contingency tables (or cross-tabulations) of a target product and a target adverse event. Models and signal scores derived from only the information contained in these 2×2 contingency tables reduce what is arguably a complex problem into a much simpler one. The complexity associated with the study of adverse event relationships stems from a multitude of factors including but not limited to: differences in dose, duration, and route, demographics, indications, comorbidities, genetics, issues associated with the terminology and/or language variability used to capture products and adverse events, and inter-factor dependencies manifested as product interactions, confounding and masking effects, product class effects, syndromic-events, and second-order effects. Therefore, the reduction of signal detection to 2×2 contingency tables may lead to loss of crucial information necessary for studying complex relationships between observed/reported products and adverse events. This in turn may lead to false alerts and/or missed signals.

Attempting to overcome these problems of false alerts and missed signals, more advanced signaling methodologies have been developed which go beyond 2×2 contingency tables and utilize more advanced modeling techniques together with more information (such as data variables). The majority of these advanced approaches, such as extended logistic regression (ELR), and regression-adjusted gamma Poisson shrinker (RGPS), (both available in Oracle® Empirica Signal), and the World Health Organization's binary logistic regression (BLR), are based on logistic regression. In logistic regression the occurrence of the target adverse event is modeled in the context of the target product and additional information represented as additional regression predictors. These additional predictors could represent dose, demographics, concomitant products, and in general any other relevant information that is available. In this regard approaches based on 2×2 contingency tables can be thought of as logistic regression with just one predictor—the target product.

—Deep Learning and Neural Signal Detection—

Generally speaking, Artificial Intelligence (AI) is the science of making intelligent computer systems that mimic cognitive processes, such as learning and problem solving, using techniques such as statistical analysis of data, expert systems that rely on if-then statements, and machine learning. AI includes a number of subfields, including machine learning (ML), neural networks, deep learning natural language processing (NLP) and generation (NLG), and image processing. These subfields may have considerable overlap.

Machine learning is an AI technique used to train software algorithms to learn from data without using explicit instructions and relying instead on patterns and inference. Forms of machine learning include supervised learning, unsupervised learning, and semi-supervised learning. Generally, the purpose of supervised learning is to approximate a mapping function between inputs and outputs so that the function can use used to accurately predict the outputs for new inputs. In supervised learning, a machine learning algorithm is presented with a training data set of example inputs and "correct" outputs, and in response the algorithm produces an inferred function(s) or model(s) that maps the inputs to the outputs, and can be used for predicting the outputs for new inputs. Supervised learning algorithms are either for classification, where the output is a category such as "cheese" or "red"; or regression, where the output is a numerical (or other) value such as money, weight, or dimension. Generally, the purpose of unsupervised learning is to discover and model an underlying structure or distribution of unlabeled data. In unsupervised learning, a machine learning algorithm is presented with unlabeled data, and in response the algorithm produces an inferred function(s) or model(s) that represents the unlabeled data. Semi-supervised learning occupies a middle space between supervised learning and unsupervised learning in which only a portion of the training data set is labeled with outputs. In semi-supervised learning, unsupervised learning techniques may be employed to discover and learn structure in the input variables, while supervised learning techniques may be used to make "best guess" predictions of unlabeled data, and use that "best guess" data to further train the model.

Neural networks are an AI technique inspired by the human brain in which complex systems are composed of artificial neurons which are connected and organized into multiple layers—input, hidden, and output layers—in a directed, weighted graph. The neurons (nodes of the graph) and connections (edges of the graph, also occasionally called "synapses") typically have a weight that adjusts as learning proceeds, which increases or decreases the strength of the output signal. During learning, the weights of the neurons and connections are adjusted by the processor (over successive generations from initial, for example random, values) until the neural network accurately and consistently identifies a pattern. Each neuron accepts one or more inputs and produces a single output which can be sent to multiple other neurons in a subsequent layer. Neurons of one layer connect only to neurons of the immediately preceding and immediately succeeding layers. The neurons of the input layer can be the feature values of input data. The neurons of the output layer are the feature values of the output. In between the input and output layers are zero or more hidden layers. The output of a neuron is found by the taking the sum of all the inputs to the neuron weighted by the weight of the incoming connection to the neuron, passing this weighted sum through an activation function of the neuron to produce an unweighted output of the neuron, and then applying the weight assigned to the neuron to the output to generate a weighted output of the neuron that will be passed to neurons in subsequent layers. Neural networks may be used in supervised, semi-supervised, and unsupervised machine learning.

Neural networks may be further extended in an AI technique referred to as deep learning, in which neural networks with multiple hidden layers are used to progressively extract higher-level features from the inputs. The term "deep" in deep learning refers to the use of multiple hidden layers in a neural network. Deep learning may be used in in supervised, semi-supervised, and unsupervised machine learning. Unlike other machine learning algorithms, neural networks for deep learning, or deep neural networks (DNNs) can be used to model complex non-linear relationships. In addition, deep learning is not confined to a specific parametric model such as with logistic regression or to the specific logic used behind decision trees. Rather, it is a flexible framework that can be tailored to a specific problem. Deep learning has proven from both a theoretical and empirical perspective (for example in applications such as computer vision, speech recognition, and natural language processing) to provide superior modeling power compared to traditional machine learning algorithms.

In one embodiment, neural signal detection, as shown and described herein, is a methodology that takes significant steps beyond RGPS. In neural signal detection, deep neural networks replace other statistical or machine learning methodologies such as logistic regression used by RGPS. Neural signal detection thus uses deep learning techniques to model relationships between products and adverse events. Neural signal detection leverages the superior modeling power of deep learning neural networks to generate signals with greater accuracy.

Consequently, neural signal detection demonstrates significant advantages over existing methodologies. In the context of signal detection, greater modeling power enables the modeling of more complex dependencies between adverse events, products, and other factors with greater accuracy. Greater modeling flexibility enables the design of neural networks that (1) support the modeling of multiple events simultaneously, (2) enable transfer learning, (3) enable modeling in the context of event or product hierarchies, and (4) enable the inclusion of external information with ease. This increases the amount of data available for modeling, enables different events to inform each other during modeling, enables the inclusion of more information, and addresses issues associated with modeling rare events. Taken together (or in isolation), greater modeling power and flexibility translate to greater signaling accuracy, that is, a reduction of false alerts and missed signals and an improvement in the timeliness (earliness) of detection. In the pharmacovigilance sector, reduction of false alerts saves significant cost and effort; while reduction of missed signals and earlier signal detection saves lives.

—Example Signal Management Environment—

FIG. 1 illustrates one embodiment of a computing system 100 associated with neural signal detection. In one embodiment, computing system 100 includes a signal management system 105 connected by the Internet 110 (or another suitable communications network or combination of networks) to an enterprise network 115. In one embodiment, signal management system 105 may be Oracle® Empirica Signal or other signal management system further configured to execute the systems and methods for neural signal detection described herein. In one embodiment, cloud signal management system 105 includes various systems and components such as neural signal detection components 120, other signal management system components 125, data store(s) 130, and web interface server 135.

In one embodiment, the components of signal management system 105 are implemented on one or more hardware computing devices or hosts interconnected by a data network. For example, the components of signal management system 105 may be executed by network-connected computing devices of one or more compute hardware shapes, such as standard (CPU or general purpose) shapes, dense input/output (I/O) shapes, graphics processing unit (GPU) shapes, and high-performance computing (HPC) shapes. Note particularly that while deep neural networks (such as those used for neural signal detection as described herein) may be trained using general purpose compute shapes, in one embodiment it is desirable to train deep neural networks using GPU compute shapes. The bandwidth optimization in main memory, thread parallelism, and higher ratio of aggregate register size to processing unit of GPU shapes (compared to the latency optimization, reduced parallelism, and lower aggregate register size to processing unit ratio of CPU shapes) may make GPU shapes preferable to CPU shapes in deep learning applications such as neural signal detection. In one embodiment, signal management system 105, or at least neural signal detection components 120, may be executed by Oracle® GPU3 or GPU4 shapes. In one embodiment, the components of signal management system 105 are each implemented by one or more dedicated computing devices. In one embodiment, several or all components of signal management system 105 are implemented by a common (or shared) computing device, even though represented as discrete units in FIG. 1. In one embodiment, components of signal management system 105 may be implemented across multiple computing devices.

In one embodiment, the components of signal management system 105 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of signal management system 105 may parse the content of an electronic message or signal received to identify commands or requests that the component can perform, and in response to identifying the command, the component will automatically perform the command or request.

In one embodiment, signal management system 105 may be implemented as a service on cloud infrastructure. In one embodiment, signal management system 105 may be hosted by a dedicated third party, for example in an infrastructure-as-a-service (IAAS), platform-as-a-service (PAAS), or software-as-a-service (SAAS) architecture. In one embodiment, signal management system 105 may be implemented on on-premises infrastructure, such as a set of one or more dedicated servers.

In one embodiment, other signal management system components 125 include components for operating signal management system 105. For example, other signal management system components 125 may include other signal detection methodology modules, such as modules for PRR, MGPS, IC, ELR, RGPS, and/or BLR signal detection; detected event management modules for managing actions related to a detected event or signal; detected event tracking modules for monitoring a detected event or signal; adverse event report intake modules for accepting submissions of averse event reports; other data collection modules for ingesting data not structured as adverse event reports; dynamic event report generation modules for generating event reports from patient data not formally submitted as an adverse event report; data analysis and visualization modules for data analyses in addition to signal detection; user interface modules for generating user interfaces to other components/modules of signal management system 105; regulatory reporting modules for preparing and monitoring submissions of safety signal information to regulatory agencies; and/or administration modules for governing the access of tenants and users to system 105.

Enterprise network 115 may be associated with a business, such as a pharmaceutical or medical device manufacturer, or other entity with an interest in monitoring downstream behavior of products. For simplicity and clarity of explanation, enterprise network 115 is represented by an on-site local area network 140 to which one or more personal computers 145, or servers 150 are operably connected, along with one or more remote user computers 155 or mobile devices 160 that are connected to the enterprise network 115 through the Internet 110. Each personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connects to local area network 140 or Internet 110 through wireless networks, such as cellular telephone networks or Wi-Fi.

Users of the enterprise network 115 may interact with signal management system 105 across the Internet 110. In one embodiment, computing systems outside of signal management system 105 (such as those of enterprise network 115) may access information or applications provided by signal management system 105 through web interface server 130. In one embodiment, the outside computing system may send requests to and receive responses from web interface server 130. In one example, access to the information or applications may be effected through use of a web browser on a personal computer 145, remote user computers 155 or mobile device 160. For example, these computing devices 145, 155, 160 of the enterprise network 115 may request and receive a web-page-based graphical user interface (GUI) for detecting signals using neural signal detection in signal management system 105. In one example, web interface server 130 may present HTML code to personal computer 145, server 150, remote user computers 155 or mobile device 160 for these computing devices to render into a GUI for signal management system 105 (including a GUI for access to functions of neural signal detection components 120). In another example, communications exchanged between web interface server 130 and personal computer 145, server 150, remote user computers 155 or mobile device 160 may take the form of remote representational state transfer (REST) requests using JavaScript object notation (JSON) as the data interchange format for example, or simple object access protocol (SOAP) requests to and from XML servers.

In one embodiment, data stores 130 includes one or more databases configured to store and serve a broad range of information relevant to applications operating in signal management system 105. In one embodiment, the data stores 130 includes a database, such as an Oracle® database. In some example configurations, data store(s) 130 may be implemented using one or more Oracle® Exadata compute shapes, network-attached storage (NAS) devices and/or other dedicated server device.

In one embodiment, neural signal detection components 120 include a neural signal detection network 165, a neural network trainer 170, a deep learning framework 175, a reports database 180, and an attention mechanism 185. In one embodiment, neural signal detection network 165 is a neural network configured, constructed, and operated to generate occurrence probabilities of one or more adverse events given input information in a report, as shown and described herein. In one embodiment, neural network trainer 170 is configured to train neural signal detection network 165, for example by estimating trainable parameters of the neural signal detection model by stochastic gradient descent as shown and described herein. In one embodiment deep learning framework 175 includes a set of tools and libraries for training deep learning networks (such as TensorFlow and PyTorch) as shown and described herein. Reports database 180 is a repository of reports—data structures describing an event and the information surrounding that event—to be examined for signal between information inputs (such as drugs) and events (such as adverse health events), as shown and described herein. In one embodiment, reports database 180 occupies a portion of data stores 130. Attention mechanism 185 is configured to provide context-sensitive weight to information inputs to neural signal detection network 165, as shown and described herein.

Each of the components (including sub-components) of signal management system 105 is configured by logic to execute the functions that the component is described as performing. In one embodiment, the components of signal management system 105 may each be implemented as sets of one or more software modules executed by one or more computing devices (such as hosts of a cloud network computing system) specially configured for such execution. In one embodiment, these modules include one or more modules for implementing the features shown and described herein.

—Example Neural Signal Detection Network—

In one embodiment, for a given target adverse event, neural signal detection maps information contained in a report (for example, products and patient information) to a probability of the target adverse event. These probabilities are then aggregated to produce statistical signal scores (disproportionality ratios) for the association between the targeted event and a particular target product.

The probabilities are computed by fitting (training) a model to the data. The model aims to capture the relationship between the information in a report (for example, drugs mentioned in a report) and the occurrence probability of the targeted adverse event. Neural signal detection uses deep neural networks to fit the model, instead of, for example, logistic regression).

In many deep learning applications, modeling objects—such as words and sentences in natural language processing and images in computer vision—are represented as dense vectors of real numbers, rather than as scalar indicator, categorical, ordinal, or continuous variables as used in regression. In signal detection, the objects that are being modeled are the products, adverse events, and the other information contained in a report, such as patient demographics or other patient information. In one embodiment, the neural signal detection systems and methods described herein represents these objects as dense vectors as well. These dense vectors are learned as part of the training/model fitting process.

Deep learning is general framework with which one can design or tailor a specific neural network topology to accomplish a specific task or model specific relationships. For this reason, deep learning applications are typically described by means of the neural network topology or layers used to represent the model.

Figure 2:
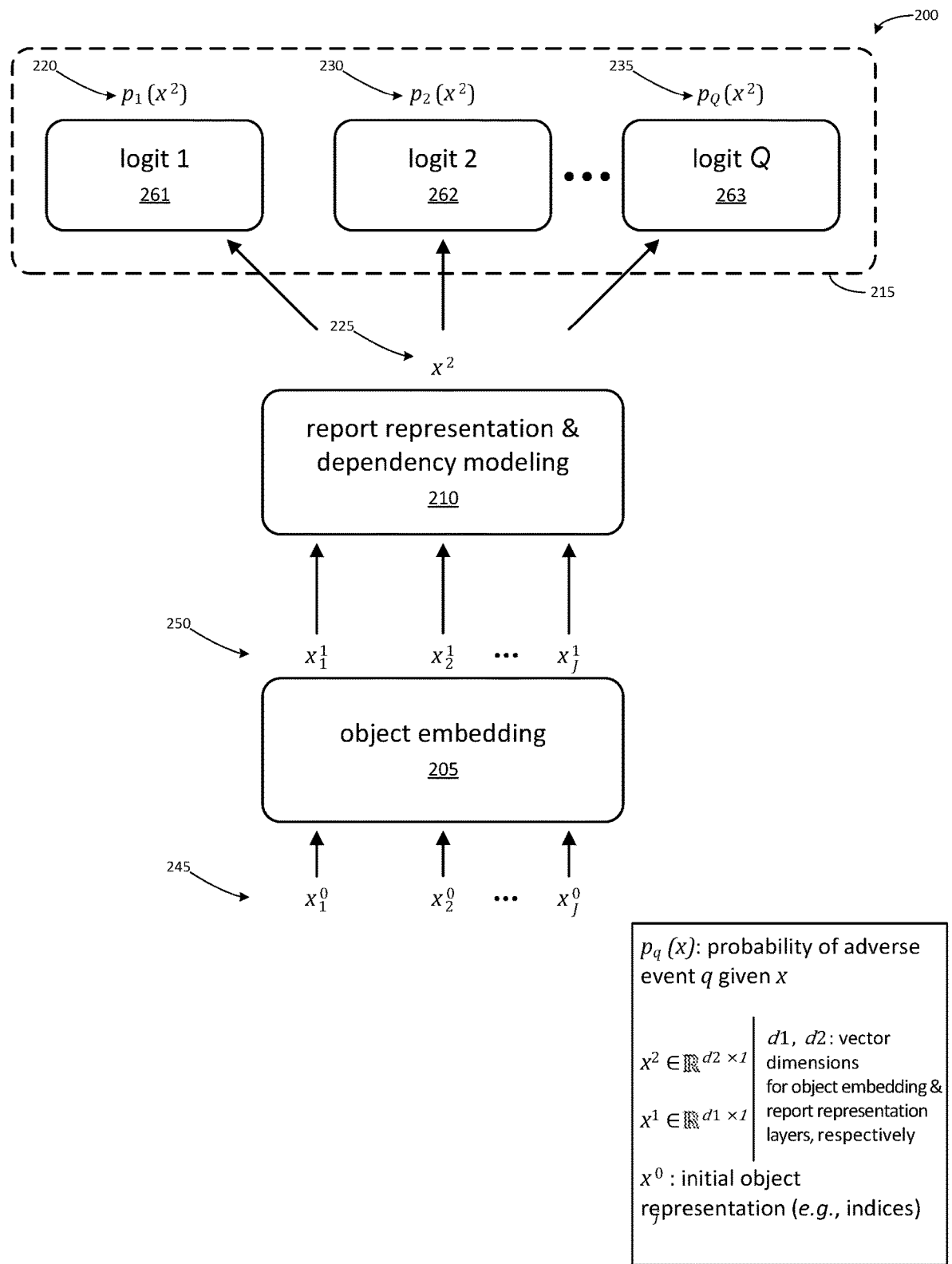
FIG. 2 illustrates one embodiment of a neural network topology associated with neural signal detection.

FIG. 2 illustrates one embodiment of a neural network 200 topology associated with neural signal detection. In one embodiment, neural network 200 for neural signal detection includes three main layers: an object embedding (or object representation) layer 205, a report representation layer 210, and a logit layer 215. Object embedding layer 205 is used for learning vector representations of the objects in a report such as products and other information. Report representation layer 210 learns a vector representation of a whole report—a vector representation that summarizes all the information included in the report, accounting for the dependencies between the objects that make up the report. logit layer 215 transforms the vector representation of a report into occurrence probabilities of the modeled adverse events. In one embodiment, one or more of these layers 205, 210, 215 may further include smaller sub-layers such as deep learning primitives, transformation layers, or other layers used for generating the results described for the main layers 205, 210, 215. In one embodiment, one or more of these layers 205, 210, 215 may be duplicated to increase the model complexity if needed. In one embodiment, each layer 205, 210, 215 can use vectors of different dimensionality.

In one embodiment, neural network 200 can be used model one target adverse event independently of others, such as is shown at occurrence probability of adverse event 1 220 given a vector representation of the report, such as report vector representation 225. In one embodiment, neural network 200 can easily be extended to model multiple target adverse events simultaneously, such as is shown at occurrence probabilities of adverse event 2 230 and adverse event 3 235 given vector representation of the report 225. There may be one or more (up to Q) target events. The occurrence probability of each of these Q target events may be given as $p_q(x^2)$.

A key to the inputs and outputs of the layers of neural network 200 is shown at reference 240. In one embodiment, neural network 200 for neural signal detection takes as input report objects $(x_i^0)$ 245 (such as drugs) that are initially represented as indices. These are fed into object embedding layer 205, which learns (and generates as output objects) vector representations for these objects $(x_i^1)$ 250. The object vector representations 250 are then fed into report representation layer 210, which summarizes all the information in the report, including object dependencies, and outputs a vector representation of the whole report $(x^2)$ 225. The report vector representation 225 is then fed into logit layer 215, which, using specific logit layers for each modeled adverse event, maps the vector representation of the report $x^2$ 225 to the occurrence probability of the modeled adverse events $p_q(x^2)$. Each layer can use vectors of different dimensionality (d1, d2). These dimensions may be determined by balancing the performance of the model against the time and computing resources needed to train the model. For example, the dimensions may be based on a guideline size, such as initially setting an embedding dimension to equal the $4^{th}$ root of the number of categories, followed by adjusting the embedding dimension until the model achieves sufficiently accurate results within an acceptable time scale. In one embodiment, neural network 200 for neural signal detection can be used to model one adverse event at a time or multiple adverse events simultaneously, sharing vector representations learned at lower levels.

In one embodiment, in logit layer 215, an individual logit layer (such as logit 1 261, logit 2, 262, logit Q 263, etc.) is implemented for each of the Q target events. Each target event's individual logit layer shares the learnings generated at lower levels of the network. The logit function or logarithm of odds function is one of several functions that serve to transform probability values (which range between 0 and 1 inclusive) to real number values (ranging between $-\infty$ and $+\infty$). The inverse logit function or logistic function is one of several sigmoid functions that serve to transform real number values ranging between $-\infty$ and $+\infty$ to probability values ranging between 0 and 1 inclusive. In one embodiment, logit layer executes an inverse logit or other sigmoid function and 215 converts a vector of real number values of report vector representation 225 to occurrence probability values (such as occurrence probabilities $p_1(x^2)$ 220, $p_2(x^2)$ 230, and $p_Q(x^2)$ 235).

—Neural Signal Detection Model—

One embodiment of a baseline neural signal detection model is described in this section. Extensions beyond the baseline model can be constructed in several ways, for example by (i) using a different version of the attention mechanism, (ii) duplicating layers (calculations), (iii) adding further intermediate layers (e.g., transformation, normalization, regularization), and (iv) modeling multiple adverse events simultaneously (rather than independently as shown). Note that the baseline neural signal detection model described herein is only one simple embodiment of neural signal detection, and in particular, is a basic structure that can be extended. Individual embodiments applying neural signal detection may vary in complexity, building upon this baseline neural signal detection model.

Notation—the parameters of an example baseline neural signal detection model are defined as follows:

$e_m$: vector embedding of the m-th object in the reports database, $e_m \in \mathbb{R}^d$ (to be estimated as a parameter)

j: index of an object in a report $x_{ij}$: vector embedding of object j in report i, $x_{ij} \in \{e_m\}$ $n_i$: number of objects in a report $h_i$: vector representation of report i $\alpha_{ij}$: attention weight of object j in report i, $x_{ij}$ w, b: parameter vector and bias of logit layer (to be estimated) $w \in \mathbb{R}^d$ v: attention parameter vector (to be estimated) $v \in \mathbb{R}^d$ $y_i$ indictor variable for presence or absence of target adverse event in report i, $y_i \in \{0,1\}$ Bolded variables denote that the variable is a vector.

Model—the example baseline neural signal detection model is described by the following equations 1-4. The equations are ordered in a last-to-first order of calculation (that is, the calculations performed last are shown first).

$$p_i = \sigma(z_i) \qquad \text{(Eq. 1)}$$

Equation 1 defines an occurrence probability of a modeled adverse event ($p_i$) in report i to be the sigmoid ($\sigma$) function of intermediate linear calculation ($z_i$) performed by a logit layer in a neural network for neural signal detection. In one embodiment, where there is a single target modeled adverse event, the occurrence probability of a modeled adverse event ($p_i$) is the output of logit layer 215 in neural network 200 for neural signal detection. In one embodiment where there are multiple (Q) target modeled adverse events, the occurrence probability for each target event, the occurrence probability of that adverse event ($p_{iq}$) is the output of the logit layer corresponding to that adverse event, for example, logit 1, 261, logit 2, 262, logit 1 263, etc.) in neural network 200 for neural signal detection.

$$z_i = w^T h_i + b \quad \text{(Eq. 2)}$$

Equation 2 defines an intermediate linear calculation ($z_i$) in report i to be the vector dot product of the transpose T of parameter vector (w) and the vector representation ($h_i$) of report i, added to a bias scalar of the logit layer. In one embodiment, the intermediate linear calculation ($z_i$) is performed by logit layer 215 in neural network 200 for neural signal detection. Note that the parameter vector (w) belongs to the set of real numbers in all dimensions (w∈ $\mathbb{R}^d$).

$$h_i = \Sigma_j \alpha_{ij} x_{ij} \quad \text{(Eq. 3)}$$

Equation 3 defines the vector representation ($h_i$) of report i to be the sum for all objects indexed by j appearing in report i, ($x_{ij}$), weighted by the attention weight ($\alpha_{ij}$). In one embodiment, the vector representation ($h_i$) representation is generated by report representation and dependency modeling layer 210 in neural network 200 for signal detection 200.

$$\alpha_{ij} = \frac{\exp(v^T x_{ij})}{\Sigma_j \exp(v^T x_{ij})} \quad \text{(Eq. 4)}$$

Equation 4 defines the attention weight of object j in report i ($\alpha_{ij}$) to be the quotient of the exponential function of the vector dot product of the transpose (T) of attention parameter vector (v) and the vector embedding of the object ($x_{ij}$) divided by the sum for all embedded objects (j) of the exponential function of the vector dot product of the transpose (T) of attention parameter vector (v) and the vector embedding of the object ($x_{ij}$). In one embodiment, the attention weight of object j in report i ($\alpha_{ij}$) is applied by report representation and dependency modeling layer 210 in neural network 200 for signal detection 200.

—Training the Neural Signal Detection Model—

In one embodiment, a neural network trainer (such as neural network trainer 170 of signal management system 105) trains a neural signal detection model (such as the baseline neural signal detection model described above). In one embodiment, neural network trainer 170 includes one or more modules for performing the training functions described herein. Neural network trainer 170 trains the neural signal detection model using a set of reports (such as reports database 280) which are to be examined to detect a signal relationship between target information (such as a drug or other medical product) and a target event (such as an adverse health event) by the neural signal detection model following the training.

In one embodiment, the training process is done in batches of multiple reports. The batch size may be a hyperparameter that is set to the largest value that can be handled by memory available to the processor (CPU or GPU).

Parameter estimation—in one embodiment, parameters of the neural signal detection model are estimated by stochastic gradient descent using the data log-likelihood as the loss function to be minimized. The data log-likelihood function is given by:

$$L = \sum_i y_i \log(p_i) + (1 - y_i)\log(1 - p_i) \quad \text{(Eq. 5)}$$
$$= \sum_i y_i \log(p_i) + \log(1 - p_i) - y_i \log(1 - p_i)$$
$$= \sum_i y_i \log\left(\frac{p_i}{1-p_i}\right) + \log(1 - p_i)$$
$$= \sum_i y_i z_i - \log(1 + e^{z_i})$$

In one embodiment, the parameter derivatives for stochastic gradient descent are automatically computed by a deep learning framework (such as deep learning framework 175). The generic form of these parameter derivatives is given by:

$$\frac{dL}{d\theta} = \sum_i \frac{dL}{dz_i} \cdot \frac{dz_i}{d\theta} = \sum_i y_i \frac{dz_i}{d\theta} - \frac{e^{z_i}}{1+e^{z_i}} \frac{dz_i}{d\theta} = \sum_i (y_i - p_i) \frac{dz_i}{d\theta} \quad \text{(Eq. 6)}$$

where θ is a parameter to be estimated, such as parameter vector w, attention parameter vector v, attention weight of an object in a report $\alpha_{ij}$, and vector embedding of an object in the reports database $e_m$. In one embodiment, the parameter derivatives for the example baseline neural signal detection model are given by equations 7-10.

The parameter derivative for parameter vector w is thus:

$$\frac{dL}{dw} = \sum_i (y_i - p_i)\frac{dz_i}{dw} = \sum_i (y_i - p_i)h_i^T = \sum_i (y_i - p_i)\left(\sum_j \alpha_{ij} x_{ij}\right)^T \quad \text{(Eq. 7)}$$

The parameter derivative for attention parameter vector v is thus:

$$\frac{dL}{dv} = \sum_i (y_i - p_i)w^T\left[\sum_j \alpha_{ij} x_{ij} x_{ij}^T - h_i h_i^T\right] \quad \text{(Eq. 8)}$$

The parameter derivative for attention weight of an object in a report $\alpha_{ij}$ is thus:

$$\frac{dL}{d\alpha_{ij}} = (y_i - p_i)\frac{dz_i}{d\alpha_{ij}} = (y_i - p_i)\frac{dz_i}{dh_i}\frac{dh_i}{d\alpha_{ij}} = (y_i - p_i)w^T x_{ij} \quad \text{(Eq. 9)}$$

The parameter derivative for vector embedding of an object in the reports database $e_m$ is thus:

$$\frac{dL}{de_m} = \sum_{i:e_m \in \{x_{ij}: j=1...n_i\}} (y_i - p_i)w^T \alpha_{ie_m}(I + (e_m - h_i)v^T) \quad \text{(Eq. 10)}$$

Assuming there are a total of M distinct objects (for example, drugs, patient demographic data, or other inputs) that can appear in the reports, then the number of parameters that need to be estimated for the example baseline neural signal detection model is given by equation 11:

$$M \times d + d + d + 1 \quad \text{(Eq. 11)}$$

for the M d-dimensional vector embeddings of the report objects, the v d-dimensional attention parameter, and the w d-dimensional probability transformation weight parameter and b 1-dimensional bias parameters respectively. In some examples, M can be very large (for example on the order of $10^4$ or $10^5$) due to the number of objects (e.g., drugs) that need to be modeled. The ability to accommodate large numbers of parameters contributes to the sensitivity of the neural signal detection network, enabling the neural signal detection network to find very complicated relationships (signal) between target inputs and target events, although it does so at the expense of potential over fitting (model generalization).

In one embodiment, a deep learning framework used to implement neural signal detection automatically estimates parameters of the neural signal detection network—in particular, parameter vector w, attention parameter vector v, bias of logit layer b, and vector embedding of an object in the reports database $e_m$—by stochastic gradient descent. Stochastic gradient descent is an optimization algorithm in which a computer processor repeatedly steps down a gradient (or slope) of a loss function by updating estimated parameter values until the estimated parameter values describe a minimum at which the gradient is approximately 0.

—Example Method—

In one embodiment, each step of computer-implemented methods described herein may be performed by a processor (such as processor 410 as shown and described with reference to FIG. 4) of one or more computing devices (i) accessing memory (such as memory 415 and/or other computing device components shown and described with reference to FIG. 4) and (ii) configured with logic to cause the system to execute the step of the method (such as neural signal detection logic 430 shown and described with reference to FIG. 4). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 415, or storage/disks 435 of computing device 405 or remote computers 465 shown and described with reference to FIG. 4, or in data stores 130 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 3:
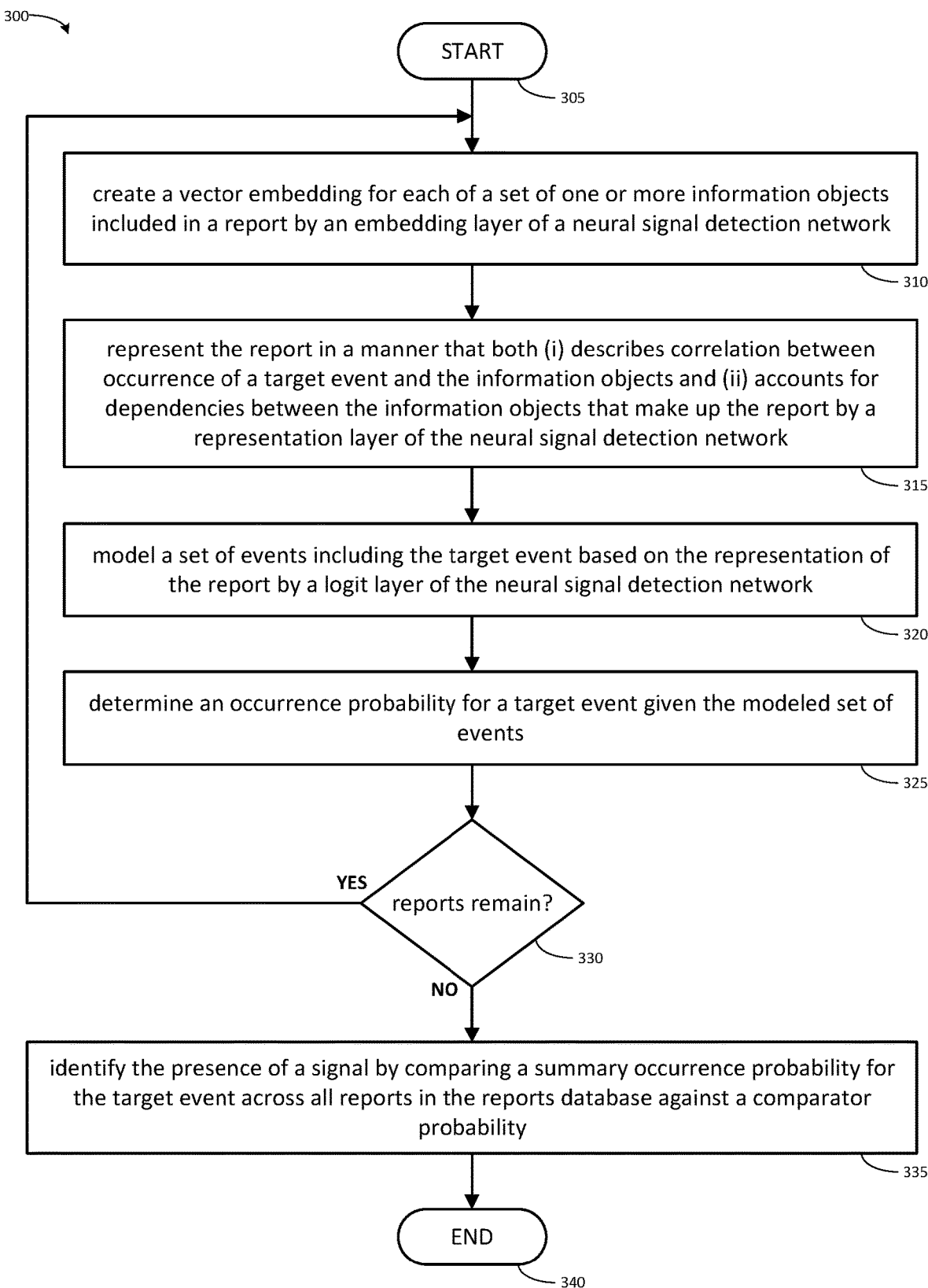
FIG. 3 illustrates one embodiment of a method associated with neural signal detection.

FIG. 3 illustrates one embodiment of a method 300 associated with neural signal detection. In one embodiment, the steps of method 300 are performed by neural signal detection components 120 of signal management system 105 (as shown and described with reference to FIG. 1). In one embodiment, neural signal detection components 120 is a special purpose computing device (such as computing device 405) configured with neural signal detection logic 430. In one embodiment, neural signal detection components 120 is a module of a special purpose computing device configured with logic 430. In one embodiment, rapid or early signal detection in data is enabled by the steps of method 300, where such early signal detection was not previously possible to be performed by computing devices.

The method 300 may be initiated automatically based on various triggers, such as in response to receiving a signal over a network or parsing stored data indicating that (i) a user (or administrator) of signal management system 105 has initiated method 300, (ii) that that method 300 is scheduled to be initiated at defined times or time intervals, (iii) that the signal management system 105 has received a new set (such as a reports database) of one or more reports. The method 300 initiates at START block 305 in response to parsing a signal received or stored data retrieved and determining that the signal or stored data indicates that the method 300 should begin. Processing continues to process block 310.

At process block 310, the processor creates a vector embedding for each of a set of one or more information objects included in a report by an embedding layer of a neural signal detection network. The set of one or more information objects includes a target object.

In one embodiment, a reports database (such as reports database 180) of one or more reports stored as report data structures is maintained, for example in data stores 130. For example, the report data structure may be a row in a table of reports. In one embodiment, the report data structure includes one or more input information objects such as: one or more observed events (including a target event being examined for a signal relationship with another input object); one or more drugs, biologics, vaccines, devices, or other medical products in use by the patient at the time of the event; limited patient demographic information describing characteristics of the patient; reporter information identifying the entity generating the report; or other potentially relevant information such as food eaten by the patient. The report has one or more indices for each information (or data) object in the report. A data object for an event may include indices for time and date of occurrence; a description of the event coded using standardized terminology from a medical coding dictionary (such as MedDRA); and a seriousness determination, for example determining an event to be serious if it is categorized as resulting in death or being life-threatening, requiring inpatient hospitalization or prolongation of existing hospitalization, resulting in persistent or significant disability or incapacity, resulting in a congenital anomaly, or being otherwise medically significant and otherwise determining the event to be non-serious. A data object for a drug may include indices for a name, a chemical formula (which may be automatically populated in response to a submission of the name alone in a report), a batch number, and a dose. A data object for patient may include indices for the age, weight, and sex of the patient. In one embodiment, a set of M information (or data) objects included in the report that are to be embedded as a vector representation is all information objects in the report. In one embodiment, the set of M objects need not be all objects in the report, and is a subset of all information objects in the report.

In one embodiment, the processor creates, generates, or embeds a vector embedding for each of a set of one or more information objects included in a report by an embedding layer of a neural signal detection network. A vector embedding is a mapping of a discrete categorical variable to a vector of real numbers. In one embodiment, vector embedding of object primitives may be used to use those objects in a neural signal detection network. In one embodiment, an object embedding layer (such as object embedding layer 205) in a neural signal detection network (such as neural signal detection network 165) creates primitives from M objects in the report. The object embedding layer is trained (using the reports of the reports database) during a training phase to translate the information (or data) objects in the report into vectors that represent the objects. In one embodiment, the processor retrieves a report from the reports database. This report is the initial object representation of the report, and includes indices describing the M objects in the report. The processor accesses each of the M objects in the report in turn, evaluates the indices of the object, and generates a vector embedding of the object—a mapping of the discrete values of the indices to a vector of continuous dimension values. These vectors have d1 dimensions. Object embedding layer includes M vectors, each representing one of the distinct objects that are being modeled. These M vectors are vector representations for the information objects in the reports database (such as object vector representations 250).

Once the processor has thus completed creating a vector embedding for each of a set of one or more information objects included in a report by an embedding layer of a neural signal detection network, processing at process block 310 completes, and processing continues to process block 315.

At process block 315, the processor represents the report in a manner that both (i) describes correlation between occurrence of a target event and the information objects and (ii) accounts for dependencies between the information objects that make up the report by a representation layer of the neural signal detection network.

In one embodiment, the processor calculates a set of $n_1$ attention weights, with one attention weight for each of the $n_i$ vector representations of information objects in the embedding layer, for example as shown and described with respect to Equation 4 herein. The processor then calculates a vector representation of the report, for example as shown and described with respect to Equation 3 herein.

In one embodiment, to calculate the set of attention weights (such as attention weights α), the processor retrieves an attention parameter vector (such as attention parameter vector v) from memory or storage (for example in data store 130). The attention parameter vector has $d_1$ dimensions. The values of the dimensions of the attention parameter vector are learned during the training phase. The processor transposes the attention parameter vector—for each element of the attention parameter vector. The transposed attention parameter vector is thus a column vector where the attention parameter vector is a row vector. The processor then determines the vector dot product of the transposed attention parameter vector and the vector embedding of each object, thus multiplying each dimension of the vector embedding of each object by a its corresponding dimension in the attention parameter vector to generate a set of intermediate product vectors, with each intermediate product vector in the set corresponding with vector embedding of an information object in a one-to-one relationship. The processor then determines the exponential function of each of these intermediate product vectors to generate a set of intermediate exponential vectors, with each intermediate exponential vector in the set corresponding with vector embedding of an information object in a one-to-one relationship. The processor then determines the sum of all these intermediate exponential vectors to generate an intermediate sum. Then, for each of the intermediate exponential vectors, the processor divides the intermediate vector by the intermediate sum to create a set of $n_i$ attention weights (such as attention weight $\alpha_{ij}$) for the vector embeddings of the $n_i$ information objects of the report, with each attention weight in the set corresponding with vector embedding of an information object in a one-to-one relationship. Because each of these attention weights in the set relates the attention vector applied to an individual embedded information object with the attention vector applied to all embedded information objects of a report, the attention weights are made context-sensitive, and reflect the relative importance of each information object in the report in view of the other objects of the report.

The processor then calculates a vector representation of the whole report (such as vector representation $h_i$ of report i). In one embodiment, to calculate the vector representation of the whole report, the processor multiplies each vector embedding of an information object in the report by the scalar attention weight corresponding to the vector representation to generate a set of intermediate weighted vectors. The processor thus applies each attention weight in the set of $n_i$ attention weights to its corresponding vector embedding of an object in the report by multiplying the vector embedding of the object (that is, the dimensions of the vector embedding) by the weight. The processor then finds the sum of all the intermediate weighted vectors to generate the vector representation of the whole report. The context-sensitivity of the applied weights enables the single vector representation of the whole report to account for dependencies between the information objects in the report.

Once the processor has thus completed representing the report in a manner that describes correlation between occurrence of a target event and the information objects and accounts for dependencies between the information objects that make up the report by a representation layer of the neural signal detection network, processing at process block 315 completes, and processing continues to process block 320.

At process block 320, the processor models a set of events including the target event based on the representation of the report by a logit layer of the neural signal detection network.

In one embodiment, the processor calculates an output value of the intermediate linear calculation (such as the value of intermediate linear calculation $z_i$) performed by the logit layer (such as logit layer 215), for example as shown and described with reference to equation 2 herein.

In one embodiment, the processor retrieves the vector representation of the whole report (such as vector representation $h_i$ of report i) created in block 315. The processor retrieves a parameter vector (such as parameter vector w). The parameter vector includes a parameter value for each dimension of the vector representation of the whole report. The parameter vector may have been estimated and stored in a previous training phase. The processor calculates the transpose of the parameter vector. The processor retrieves a bias of the logit layer (such as bias b). The processor then calculates the transpose of the parameter vector to produce a transposed parameter vector. The processor then determines the vector dot product of the transposed parameter vector and the vector representation of the whole report. The processor then adds the bias to that vector dot product. The bias is added to reduce variance to avoid over-fitting, introducing flexibility and better generalization to the neural signal detection network. The processor thus generates an output value of the intermediate linear calculation. The processor thus calculates a model of the report (such as the vector representation of the report $x^2$ 225).

Once the processor has thus completed modeling a set of events including the target event based on the representation of the report by a logit layer of the neural signal detection network, processing at process block 320 completes, and processing continues to process block 325.

At process block 325, the processor determines an occurrence probability for a target event given the modeled set of events.

In one embodiment, the processor converts real number values representing modeled events (in the model of events) to occurrence probabilities for events by calculating a sigmoid function such as the inverse logit (or logistic) function that represent the occurrence of the event given the model of events, for example in logit layer 215. In one embodiment, the sigmoid function, such as the inverse logit (or logistic) function, hyperbolic tangent function, arctangent function, error function or other function demonstrating an S-shaped curve characteristic of sigmoid functions. The processor retrieves the output values of the intermediate linear calculation—the model of the events generated from the vector representation of the whole report. In the logit layer, the processor calculates the sigmoid function for the output values of the intermediate linear calculation. The values resulting from calculating the sigmoid function is the occurrence probability for the event, given the initial object representation of the report.

In one embodiment, the processor determines an occurrence probability for a single target event belonging to the set of events, for example as shown at reference 220. In one embodiment, the processor determines occurrence probabilities for multiple different target events belonging to the set of events, for example as shown at references 230 and 235.

The processor stores the occurrence probability of the target event in a set of occurrence probabilities for all reports included in a reports database (or other set of reports). For example, the processor may store the occurrence probability of the target event in an occurrence probabilities data structure, at a position designated for the particular report (and where multiple target events may occur, a position further designated for the particular target event).

Once the processor has thus completed determining an occurrence probability for a target event given the modeled set of events, processing at process block 325 completes, and processing continues to decision block 330.

In one embodiment, the process described at process blocks 310-330 for determining an occurrence probability for a target event given the events of a report is repeated for a plurality of reports in a set of reports, such as all reports in a reports database, or a subset of the reports in the reports database. In one embodiment, any set of reports may be selected, and may include all, some, or a single one of the available reports. At decision block 330, the processor determines whether or not reports remain in the set of reports. Where reports remain in the set of reports (decision block 330: YES), processing at decision block 330 completes, and processing proceeds to process block 310, where processing repeats for the next report in the set of reports. In one embodiment, the processor may increment a report index (for example, report index i) and return to process block 310 to repeat blocks 310-325 for the report indicated by the report index. Where no reports remain in the set of reports (decision block 330: NO), processing at decision block 330 completes, and processing continues to process block 335.

At process block 335, the processor identifies the presence of a signal by comparing a summary occurrence probability for the target event across all reports in the reports database against a comparator probability.

In one embodiment, the processor determines a signal score, such as is shown and described with respect to equations 12-14 below. The processor retrieves the set of occurrence probabilities for all reports for a target event, for example by retrieving them from the occurrence probabilities data structure. The processor then calculates the sum of all the retrieved occurrence probabilities for the target event to generate a summary occurrence probability for the target event across all reports in the reports database. The processor then divides the summary occurrence probability by a comparator probability to generate the signal score. The comparator probability represents the probability of the target event where the report does not include the target information (such as a drug or other medical product) that is being examined for a relationship to the target event. The processor then compares the signal score against a threshold value that indicates that signal is present. In one embodiment, the processor identifies the presence of a signal when the signal score meets or exceeds the threshold, and identifies the absence of signal when the signal score falls short of the threshold. The processor writes an indication of the detected presence or absence of this signal in an output data structure for subsequent use.

The threshold value may be pre-determined, for example by selecting a threshold known to be a reasonably good differentiator between signal and noise. For example, a signal score threshold of approximately 2—in which the target event is twice as likely when the report includes the target information (such as a drug) than when the report does not include the target information—is sufficient to indicate a clear signal relationship. Signal scores thresholds between 1 and 2 can also be used to increase sensitivity. In signal detection, increased sensitivity comes with the risk of creating burdensome false positive signal detections. The systems and methods for neural signal detection described herein deliver higher sensitivity with a lower risk of false positive signal detection than is present using other signal detection algorithms. Accordingly, the systems and methods for neural signal detection described herein can detect signal using a lower signal score threshold between 1 and 2 due to the finer correlation modeling and dependency modeling offered by neural signal detection. Signal scores in excess of 2 can also be used to decrease sensitivity, at the risk of missing actual signal detections.

Additionally, signal scores below 1, and especially below 0.5, may be indicative of an inverse signal relationship between target information and target event—for example, a signal score for a target drug and a target adverse event that is below 1 may indicate a preventive effect of the drug on the target adverse event. An additional inverse signal threshold—for example of 0.5, indicating the target event to be half as likely with the target information (drug) as without—may therefore be set and compared against the signal score.

In one embodiment, signal management system 105 may cause the indication of the presence of a signal to be displayed as an alert in a graphical user interface of the signal management system 105. In one embodiment, the indication of presence of a signal may also be a trigger that causes signal management system 105 to initiate other processes, including sending alert messages, or generating and presenting a graph showing the signal data for display. This is especially useful for early alerting regarding the detection of adverse effects of a drug or other medical product, where rapidity of response can save lives. Thus, in one embodiment, where the target object is a target drug and the set of target events includes an adverse health event, the system can proceed to compute a signal score from the event probability and a comparator probability; determine the presence of a signal in response to the signal score exceeding a threshold indicating the presence of a signal; and immediately present an alert for display by remote systems indicating that a signal has been detected.

Once the processor has thus completed identifying the presence of a signal by comparing a summary occurrence probability for the target event across all reports in the reports database against a comparator probability, processing at process block 335 completes, and processing continues to END block 340, where process 300 ends.

—Inference and Signal Score Calculation—

In one embodiment, neural signal detection signal scores are computed as ratios of event probabilities (or counts) for a target drug versus a comparator, as discussed above with reference to process block 335. This is consistent with other signal detection methodologies used in the pharmacovigilance space. For example, for a target drug and target adverse event, the neural signal detection ratio is defined as the average probability of the target event given the information included in the reports that contain the target drug, divided by the average probability of the event for the same set of reports manipulated to create a comparator. In this way each report may serve as its own control—another advantage offered by the systems and methods for neural signal detection described herein that is not broadly available among other signal detection systems and methods. The ratio (signal score) is computed after a model has been fit to the data and the model parameters have been estimated. The model is not re-fit to the data to compute the comparator probabilities (ratio denominator). Instead, the reports or model parameters are used differently in order to arrive at the comparator probabilities. Thus, in one embodiment, the signal management system 105 may compute a signal score from the summary occurrence probability and a comparator probability derived from the same set of reports used to create the summary occurrence probability.

Different signal scores can be computed by manipulating the reports or model parameters to create different comparator probabilities (or counts). Formally, one example of signal score calculation for a given target drug and target event is given by equations 12-14:

$$\text{signal score} = \frac{P_1}{P_2} \qquad \text{(Eq. 12)}$$

$$P_1 = \sum\nolimits_{i:e \in \{x_{ij}: j=1\ldots n_i\}} p_i \qquad \text{(Eq. 13)}$$

$$P_2 = \sum\nolimits_{i:e \in \{x_{ij}: j=1\ldots n_i\}} \sigma(w^T h_i + b) \qquad \text{(Eq. 14)}$$

where e is vector embedding of the target drug, where e is a real number in all dimensions ($e \in \mathbb{R}^d$) and the vector representation $h_i$ of report i is calculated differently to generate different comparator probabilities to use the report as its own control. In one embodiment, the signal management system 105 can derive the comparator probability from the same set of reports used to create the signal score by re-computing a further summary occurrence probability from each report used to calculate the summary occurrence probability while ignoring or disregarding the target drug in the report. Two such calculations are described below.

1. Comparator probabilities ($P_2$) may be calculated by removing the target drug from each report used in the original calculation ($P_1$) and re-computing the event probability, as follows:

$$h_i = \Sigma_{j:x_{ij} \neq e} \alpha_{ij} x_{ij} \qquad \text{(Eq. 15)}$$

$$\alpha_{ij} = \frac{\exp(v^T x_{ij})}{\Sigma_{j:x_{ij} \neq e} \exp(v^T x_{ij})} \qquad \text{(Eq. 16)}$$

where vector embedding of the target drug e is not included in vector embedding of objects in a report $x_{ij} \neq e$. In this first method, signal management system 105 computes the comparator probability by re-computing a further summary occurrence probability with the target object removed from each report used to calculate the summary occurrence probability.

2. Comparator probabilities ($P_2$) may be calculated by setting the attention weight of the target drug to zero in each report used in the original calculation ($P_1$) and re-computing the event probability, as follows:

$$h_i = \sum\nolimits_j \alpha_{ij} x_{ij} \qquad \text{(Eq. 17)}$$

$$a_{ij} = \begin{cases} \dfrac{\exp(v^T x_{ij})}{\sum_j \exp(v^T x_{ij})} & x_{ij} \neq e \\ 0 & x_{ij} = e \end{cases} \qquad \text{(Eq. 18)}$$

In this second method, signal management system 105 computes the comparator probability by re-computing a further summary occurrence probability from each report used to calculate the summary occurrence probability with an attention weight assigned to the target object set to zero for each report.

—Attention Mechanisms—

In one embodiment, report representation layer 210 includes dependency modeling functions that account for the dependencies between the objects that make up the report when learning the vector representation of the whole report 255. For example, assuming the relationship between a target drug and target adverse event is confounded by the presence of a second drug, report representation layer 210 learns this dependency and represents a report including the target drug and the confounding drug differently than a report that includes the target drug and a different drug, and in a manner that reflects the confoundment. Or, in a similar example, when a second drug interacts rather than confounds the target drug, the report representation layer 210 learns this dependency and represents a report including the target drug and the interacting drug differently than a report that includes the target drug and a different drug, and in a manner that reflects the interaction.

In one embodiment, the neural signal detection systems and methods described herein use deep learning attention mechanisms to implement the report representation layer 210 and learn a vector representation of the whole report. Attention mechanisms are extensively used in natural language processing applications, and were conceived to mimic cognitive attention. Attention mechanisms are designed to identify, enhance, and devote more computing power to important parts of the input data while fading out, attenuating, or ignoring the rest. Deciding which part of the data is more important than others depends on context—that is, other parts of the input data (for example, objects in the report). Deciding relative importance of the various parts of the data is learned through the deep learning training process. Attention mechanisms attach context-sensitive weights to each part of the input, which reflect the relative importance of each part in relation to other parts and thus in relation to the whole. Because these weights are context-sensitive, the same object can receive different weights depending on the other objects it appears with. Given these weights, attention mechanisms can be used to compute a context-sensitive summary of the whole by computing a weighted average of the parts.

In one embodiment, the input corresponds to a report that is represented by a set of objects, such as the drugs mentioned in the report. For example, a report is a data structure such as a row object that includes other data structures or objects for drugs and for patient demographic information. This report row object may be a row of a table of such report objects in a relational database.

In one embodiment, the attention mechanism determines the predictive power each object (drug, patient demographic, patient conditions) in a report has relative to other objects in the report on the likelihood of the adverse event. For example, the attention mechanism learns to assign more weight to a drug that is known to cause the target adverse event than another drug that does not cause the adverse event when they are both mentioned in the same report. In this way, the neural network for neural signal detection will pay more "attention" to drugs known to cause the adverse event. The attention mechanism also learns to modify the weight of a target drug when it is reported with another drug that confounds its relationship with the adverse event or when it is reported with a drug that interacts with it to modify the likelihood of the adverse event. In this way, the neural network for neural signal detection will pay more "attention" to target drugs where it is known that other objects in the report are known to reduce the likelihood of the target event.

In one embodiment, the overall likelihood of the adverse event given all the objects in a report is a function—performed in one embodiment by the logit layer—of the attention weighted average of these objects. Consequently, the vector representation of the whole report is a weighted average of the vector representations of the report objects, with the weights determined by the attention mechanism. The vector representation of the whole report is described more formally above.

Thus, in one embodiment, neural signal detection components 120 include an attention mechanism 180. In one embodiment, the parameters of attention mechanism 180 are learned by neural network trainer 170, which is responsible for assigning weights in the neural signal detection network during the training phase. The strength and type (positive or negative) of relationships between inputs and events are learned from the data during training. The attention mechanism may thus adjust a weight applied to input information (s) based on the strength of its relationship with a chosen target effect or other input information. For example, a weight may be increased as the strength of the relationship between information and effect increases.

In one embodiment, the attention weight is contextual, and depends on input information other than the target object. Thus, attention mechanism 180 attaches an attention weight to each of the information objects, and the attention weight attached to each information object is based on at least one other of the information objects. For example, where the target object is a target drug, the relationship database may indicate that the set of one or more information objects included in the report further includes a second drug that has confounding or masking effects regarding the target drug. In one embodiment, the relationship database may indicate that a first information object is known to cause the target event. In this case, the attention mechanism 180 will attach an attention weight to each of the information objects, with a first attention weight attached to the first information object that is known to cause the target event being greater than other attention weights assigned to other information objects that are not known to cause the target event. In one embodiment, the relationship database may indicate that a first information object is known to reduce the likelihood of the target event. In this case the attention mechanism 180 will attach an attention weight to each of the information objects, with a first attention weight attached to a first information object that is known to reduce the likelihood of the target event being greater than other attention weights assigned to other information objects that are not known to reduce the likelihood of the target event.

—Software Module Embodiments—

In general, software instructions are designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Cloud or Enterprise Embodiments—

In one embodiment, the present system (such as signal management system 105) is a computing/data processing system including a computing application or collection of distributed computing applications for access and use by other client computing devices associated with an enterprise (such as the client computers 144, 150, 155, and 160 of enterprise network 115) that communicate with the present system over a network (such as network 110). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions.

—Computing Device Embodiments—

Figure 4:
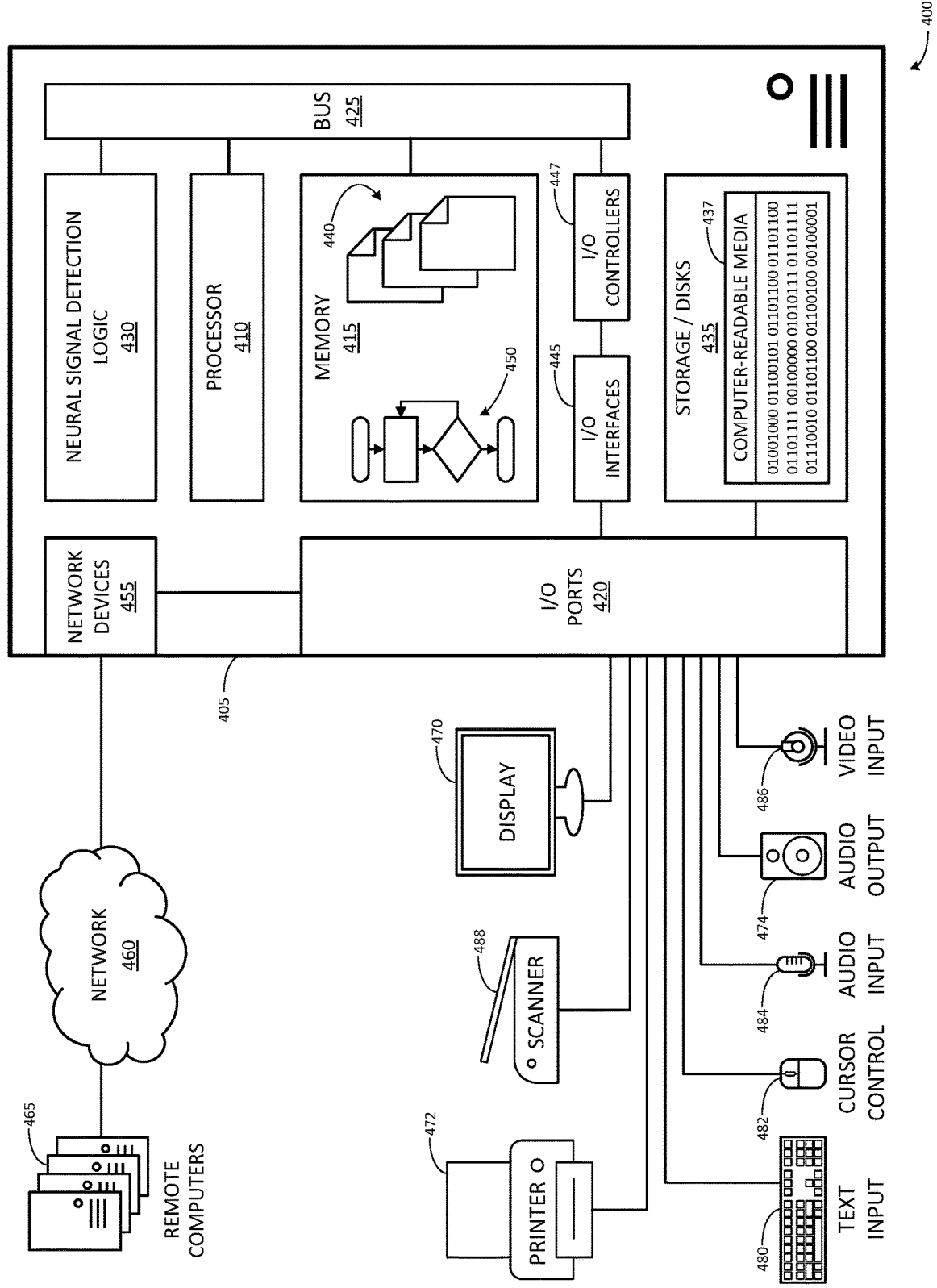
FIG. 4 illustrates an embodiment of a computing system configured with the example systems and/or methods disclosed.

FIG. 4 illustrates an example computing system 400 that is configured and/or programmed as a special purpose computing device with one or more of the example systems and methods described herein, and/or equivalents. The example computing device may be a computer 405 that includes a processor 410, a memory 415, and input/output ports 420 operably connected by a bus 425. In one example, the computer 405 may include neural signal detection logic 430 configured to facilitate neural signal detection similar to the logic, systems, and methods shown and described with reference to FIGS. 1-3. In different examples, neural signal detection logic 430 may be implemented in hardware, a non-transitory computer-readable medium with stored instructions, firmware, and/or combinations thereof. While neural signal detection logic 430 is illustrated as a hardware component attached to the bus 425, it is to be appreciated that in other embodiments, neural signal detection logic 430 could be implemented in the processor 410, stored in memory 415, or stored in disk 435 on computer-readable media 437.

In one embodiment, neural signal detection logic 430 or the computing system 400 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform neural signal detection. The means may also be implemented as stored computer executable instructions that are presented to computer 405 as data 440 that are temporarily stored in memory 415 and then executed by processor 410.

Neural signal detection logic 430 may also provide means (e.g., hardware, non-transitory computer-readable medium that stores executable instructions, firmware) for performing neural signal detection.

Generally describing an example configuration of the computer 405, the processor 410 may be a variety of various processors including dual microprocessor and other multi-processor architectures. A memory 415 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 435 may be operably connected to the computer 405 by way of, for example, an input/output (I/O) interface (for example, a card or device) 445 and an input/output port 420 that are controlled by at least an input/output (I/O) controller 447. The disk 435 may be, for example, a magnetic disk drive, a solid-state disk drive, a floppy disk drive, a tape drive, a Zip drive, a flash memory card, a memory stick, and so on. Furthermore, the disk 435 may be a CD-ROM drive, a CD-R drive, a CD-RW drive, a DVD ROM, and so on. The memory 415 can store a process 450 and/or data 440 formatted as one or more data structures, for example. The disk 435 and/or the memory 415 can store an operating system that controls and allocates resources of the computer 405.

The computer 405 may interact with, control, and/or be controlled by input/output (I/O) devices via the input/output (I/O) controller 447, the I/O interfaces 445 and the input/output ports 420. The input/output devices include one or more displays 470, printers 472 (such as inkjet, laser, or 3D printers), and audio output devices 474 (such as speakers or headphones), text input devices 480 (such as keyboards), a pointing and selection device 482 (such as mice, trackballs, touchpads, touch screens, joysticks, pointing sticks, stylus mice), audio input devices 484 (such as microphones), video input devices 486 (such as video and still cameras), video cards (not shown), disk 435, network devices 455, and so on. The input/output ports 420 may include, for example, serial ports, parallel ports, and USB ports.

The computer 405 can operate in a network environment and thus may be connected to the network devices 455 via the I/O interfaces 445, and/or the I/O ports 420. Through the network devices 455, the computer 405 may interact with a network 460. Through the network 460, the computer 405 may be logically connected to remote computers 465. In one embodiment, computer 405 and other computers 465 may be configured to act in concert as a cloud network offering computing services to other client computers. Networks with which the computer 405 may interact include, but are not limited to, a LAN, a WAN, a cloud, and other networks.

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

AI: artificial intelligence.
API: application programming interface.
ASIC: application specific integrated circuit.
BLR: binary logistic regression.
CD: compact disk.
   CD-R: CD recordable.
   CD-RW: CD rewriteable.
CPU: central processing unit.
DNN: deep neural network.
DVD: digital versatile disk and/or digital video disk.
ELR: extended logistic regression.

GPU: graphics processing unit.
GUI: graphical user interface.
HPC: high-performance computing.
HTTP: hypertext transfer protocol.
IAAS: infrastructure-as-a-service.
IC: information component.
I/O: input/output.
JSON: JavaScript object notation.
LAN: local area network.
MGPS: multi-item gamma Poisson shrinker.
ML: machine learning.
NAS: network-attached storage.
NLG: natural language generation.
NLP: natural language processing.
PAAS: platform-as-a-service.
PCI: peripheral component interconnect.
PRR: proportional reporting ratio.
RAM: random access memory.
  DRAM: dynamic RAM.
  SRAM: synchronous RAM.
ReLU: rectified linear unit.
REST: representational state transfer.
RGPS: regression-adjusted gamma Poisson shrinker.
ROM: read only memory.
  PROM: programmable ROM.
  EPROM: erasable PROM.
  EEPROM: electrically erasable PROM.
SAAS: software-as-a-service.
SOAP: simple object access protocol.
SQL: structured query language.
TCP/IP: transmission control protocol/internet protocol.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:
for a plurality of reports in a reports database:
create, by at least the processor, a vector embedding for each of a set of one or more information objects included in a report by an embedding layer of a neural signal detection network,
wherein the set of one or more information objects includes a target object;
represent, by at least the processor, the report in a manner that describes correlation between occurrence of a target event and the information objects and accounts for dependencies between the information objects that make up the report by a representation layer of the neural signal detection network;
model, by at least the processor, a set of events including the target event based on the representation of the report by a logit layer of the neural signal detection network;
determine, by at least the processor, an occurrence probability for the target event given the modeled set of events; and
identify, by at least the processor, the presence of a signal by comparing a summary occurrence probability for the target event across the plurality of reports in the reports database against a comparator probability.

2. The non-transitory computer-readable medium of claim 1, further comprising instructions that when executed by at least the processor cause the processor to compute a signal score from the summary occurrence probability and a comparator probability derived from the same set of reports used to create the summary occurrence probability.

3. The non-transitory computer-readable medium of claim 2, further comprising instructions that when executed by at least the processor cause the processor to compute the comparator probability by re-computing a further summary occurrence probability with the target object removed from each report used to calculate the summary occurrence probability.

4. The non-transitory computer-readable medium of claim 2, further comprising instructions that when executed by at least the processor cause the processor to compute the comparator probability by re-computing a further summary occurrence probability from each report used to calculate the summary occurrence probability with an attention weight assigned to the target object set to zero for each report.

5. The non-transitory computer-readable medium of claim 1, further comprising instructions that when executed by at least the processor cause the processor to train the neural signal detection network by estimating parameters of the neural signal detection network by stochastic gradient descent using data log-likelihood as the loss function to be minimized.

6. The non-transitory computer-readable medium of claim 1, further comprising instructions that when executed by at least the processor cause the processor to attach an attention weight to each of the information objects, wherein the attention weight attached to each information object is based on at least one other of the information objects.

7. The non-transitory computer-readable medium of claim 1, wherein the target object is a target drug, and the set of one or more objects included in the report further includes a second drug that has confounding or masking effects regarding the target drug.

8. A computer implemented method, comprising:
for a plurality of reports in a reports database:
create a vector embedding for each of a set of one or more information objects included in a report by an embedding layer of a neural signal detection network, wherein the set of one or more information objects includes a target object;
representing the report in a manner that describes correlation between occurrence of a target event and the information objects and accounts for dependencies between the information objects that make up the report by a representation layer of the neural signal detection network;
modeling a set of events including the target event based on the representation of the report by a logit layer of the neural signal detection network;
determining an occurrence probability for the target event given the modeled set of events; and
identifying the presence of a signal by comparing a summary occurrence probability for the target event across the plurality of reports in the reports database against a comparator probability.

9. The computer-implemented of claim 8, further comprising computing a signal score from the summary occurrence probability and a comparator probability derived from the same set of reports used to create the signal score by re-computing a further summary occurrence probability with the target object removed from each report used to calculate the summary occurrence probability.

10. The computer-implemented of claim 8, further comprising computing a signal score from the summary occurrence probability and a comparator probability derived from the same set of reports used to create the signal score by re-computing a further summary occurrence probability from each report used to calculate the summary occurrence probability with an attention weight assigned to the target object set to zero for each report.

11. The computer-implemented of claim 8, further comprising training the neural signal detection network by estimating parameters of the neural signal detection network by stochastic gradient descent using data log-likelihood as the loss function to be minimized.

12. The computer-implemented of claim 8, further comprising attaching an attention weight to each of the information objects, wherein a first attention weight attached to a first information object that is known to cause the target event is greater than other attention weights assigned to other information objects that are not known to cause the target event.

13. The computer-implemented of claim 8, further comprising attaching an attention weight to each of the information objects, wherein a first attention weight attached to a first information object that is known to reduce the likelihood of the target event is greater than other attention weights assigned to other information objects that are not known to reduce the likelihood of the target event.

14. The computer-implemented of claim 8, wherein the target object is a target drug, and the set of target events includes an adverse health event.

15. The computer-implemented of claim 8, wherein the target object is a target drug, and the set of target events includes a positive health event.

16. A computing system comprising:
a processor;
a memory operably connected to the processor;
a non-transitory computer-readable medium operably connected to the processor and memory and storing computer-executable instructions that when executed by at least a processor of a computer cause the computing system to:
for a plurality of reports in a reports database:
- create a vector embedding for each of a set of one or more information objects included in a report by an embedding layer of a neural signal detection network,
  wherein the set of one or more information objects includes a target object;
- represent the report in a manner that describes correlation between occurrence of a target event and the information objects and accounts for dependencies between the information objects that make up the report by a representation layer of the neural signal detection network;
- model a set of events including the target event based on the representation of the report by a logit layer of the neural signal detection network;
- determine an occurrence probability for the target event given the modeled set of events; and
- identify the presence of a signal by comparing a summary occurrence probability for the target event across the plurality of reports in the reports database against a comparator probability.

17. The computer system of claim 16, wherein the instructions when executed further cause the computing system to train the neural signal detection network by estimating parameters of the neural signal detection network by stochastic gradient descent using data log-likelihood as the loss function to be minimized.

18. The computer system of claim 16, wherein the instructions when executed further cause the computing system to attach an attention weight to each of the information objects, wherein the attention weight attached to each information object is based on at least one other of the information objects.

19. The computer system of claim 16, wherein the target object is a target drug, wherein the set of target events includes an adverse health event, wherein the instructions when executed further cause the computing system to
- compute a signal score from the event probability and a comparator probability;
- determine the presence of a signal in response to the signal score exceeding a threshold indicating the presence of a signal; and
- present an alert for display by remote systems indicating that a signal has been detected.

20. The computer system of claim 16, wherein the instructions when executed further cause the computing system to derive the comparator probability from the same set of reports used to create the signal score by re-computing a further summary occurrence probability from each report used to calculate the summary occurrence probability while ignoring the target drug in the report.

* * * * *